United States Patent
Kaki et al.

(10) Patent No.: US 12,190,121 B2
(45) Date of Patent: Jan. 7, 2025

(54) DISTRIBUTION OF BOOTSTRAP MANAGEMENT FOR APPLICATION MONITORING

(71) Applicant: VMware LLC, Palo Alto, CA (US)

(72) Inventors: Venkata Padma Kaki, West Godavari (IN); Vineeth Totappanavar, Bangalore (IN); Rahul Singh, Benares (IN); Rohit Saraf, Haryana (IN); Aswathy Ramabhadran, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/727,766

(22) Filed: Apr. 24, 2022

(65) Prior Publication Data
US 2023/0342163 A1    Oct. 26, 2023

(51) Int. Cl.
| | | |
|---|---|---|
| G06F 9/00 | (2018.01) | |
| G06F 9/4401 | (2018.01) | |
| G06F 9/50 | (2006.01) | |
| G06F 9/54 | (2006.01) | |

(52) U.S. Cl.
CPC ............ *G06F 9/4406* (2013.01); *G06F 9/505* (2013.01); *G06F 9/541* (2013.01); *G06F 9/4401* (2013.01)

(58) Field of Classification Search
CPC ......... G06F 9/4406; G06F 9/505; G06F 9/541
USPC .......................................................... 713/2
See application file for complete search history.

(56) References Cited

U.S. PATENT DOCUMENTS

| | | | |
|---|---|---|---|
| 8,667,564 B1* | 3/2014 | Breau | H04L 65/1104 709/227 |
| 8,850,528 B2 | 9/2014 | Van Biljon et al. | |
| 8,977,679 B2 | 3/2015 | Van et al. | |
| 9,032,069 B2 | 5/2015 | Van Biljon et al. | |
| 10,176,033 B1* | 1/2019 | Wang | G06F 11/0793 |
| 10,592,350 B2 | 3/2020 | Dornemann | |
| 11,175,964 B2 | 11/2021 | Jaeger et al. | |
| 2003/0005096 A1* | 1/2003 | Paul | H04L 9/40 709/230 |
| 2004/0093400 A1* | 5/2004 | Richard | H04L 41/0803 709/222 |
| 2004/0264398 A1* | 12/2004 | Chu | G06F 9/505 370/312 |
| 2005/0172161 A1 | 8/2005 | Cruz et al. | |
| 2006/0015618 A1 | 1/2006 | Freimuth et al. | |
| 2006/0143432 A1* | 6/2006 | Rothman | H04L 67/34 713/2 |
| 2007/0214348 A1* | 9/2007 | Danielsen | G06F 9/4416 713/2 |
| 2008/0098121 A1* | 4/2008 | Wu | H04L 12/66 709/227 |

(Continued)

OTHER PUBLICATIONS

Getting Started with Containers, Red Hat Enterprise Linux Atomic Host 7, Red Hat (Year:2020), Jun. 6, 2020, 64 pgs.

(Continued)

*Primary Examiner* — Volvick Derose
(74) *Attorney, Agent, or Firm* — Quarles & Brady LLP

(57) ABSTRACT

The present invention is a highly available system comprising a system to send a plurality of bootstrap requests, at least one cloud proxy fit to receive the plurality of bootstrap requests, wherein each instance of the at least one cloud proxy is coupled with an adapter, and at least one host fit to communicate with one of the at least one cloud proxy.

18 Claims, 3 Drawing Sheets

(56) References Cited

U.S. PATENT DOCUMENTS

| | | | |
|---|---|---|---|
| 2009/0138955 A1* | 5/2009 | Vinayakray-Jani | H04W 12/0431 726/12 |
| 2010/0115598 A1* | 5/2010 | Barriga | H04L 63/0815 726/8 |
| 2011/0078489 A1* | 3/2011 | Song | H04L 67/104 714/E11.023 |
| 2012/0117229 A1 | 5/2012 | Van et al. | |
| 2013/0060839 A1 | 3/2013 | Van et al. | |
| 2013/0198332 A1* | 8/2013 | Van Ackere | H04L 45/54 709/217 |
| 2014/0032892 A1* | 1/2014 | Jin | H04W 4/50 713/2 |
| 2014/0244989 A1* | 8/2014 | Hiltgen | G06F 9/4416 713/2 |
| 2015/0295800 A1 | 10/2015 | Bala et al. | |
| 2016/0036819 A1* | 2/2016 | Zehavi | H04L 67/12 726/4 |
| 2016/0366142 A1 | 12/2016 | Kamble | |
| 2017/0262347 A1 | 9/2017 | Dornemann | |
| 2017/0366606 A1* | 12/2017 | Ben-Shaul | G06F 3/061 |
| 2018/0160385 A1* | 6/2018 | Chastain | H04W 8/04 |
| 2018/0191718 A1 | 7/2018 | Kuzkin et al. | |
| 2019/0190771 A1 | 6/2019 | Fang | |
| 2020/0250009 A1 | 8/2020 | Jaeger et al. | |
| 2021/0397522 A1 | 12/2021 | Owen et al. | |
| 2022/0086025 A1* | 3/2022 | Tewari | H04L 41/0803 |
| 2023/0105901 A1* | 4/2023 | Adogla | H04L 41/0895 718/100 |
| 2023/0156004 A1* | 5/2023 | Cope | H04L 61/2528 726/5 |
| 2023/0188972 A1* | 6/2023 | Goel | H04W 8/18 370/328 |
| 2023/0342163 A1* | 10/2023 | Kaki | G06F 9/505 |

OTHER PUBLICATIONS

Ellingwood, How to Set Up Highly Available HAProxy Servers with Keepalived and Reserved IPs on Ubuntu 14.04 (Year: 2015), 2015, 26 pgs.

Ramirez, How to Run HAProxy with Docker (Year: 2021), 2021, 6 pgs.

Shetti, Application Status Collection in Kubernetes via Telegraf Sidecars and Wavefront, Aug. 8, 2018, 14 pgs.

* cited by examiner

DISTRIBUTION OF BOOTSTRAP MANAGEMENT FOR APPLICATION MONITORING

BACKGROUND ART

In order to monitor numerous virtual machines, OS, and Applications running on them, VMware has developed a system which would do metric analysis and help an end user in understanding the state of their applications. Prior solutions were functional but had the drawback of a hard limit on the hosts a single Cloud Prosy could handle. Should the end user exceed that number, they would have to pick and choose which applications to prioritize in monitoring and analyzing.

In order to perform administrative actions on these systems, bootstrapping actions must be done to set up the appropriate software and environment. Should a user want to bootstrap multiple hosts/endpoints of a number greater than the suggested guidelines of what a cloud proxy can handle, then the user will be unable to configure all of the endpoints and will have to manually select which ones to bootstrap, leaving the remaining endpoints unmonitored. With unmonitored endpoints, it is possible for errors or important data to occur which the user would be unaware of. For example, should a service on an unmonitored host go down, the user would be unable to know how or why the service failed.

BRIEF DESCRIPTION OF THE DRAWINGS

The accompanying drawings, which are incorporated in and form a part of this specification, illustrate embodiments of the present technology and, together with the description, serve to explain the principles of the present technology.

DETAILED DESCRIPTION OF THE EMBODIMENTS

Figure 1:
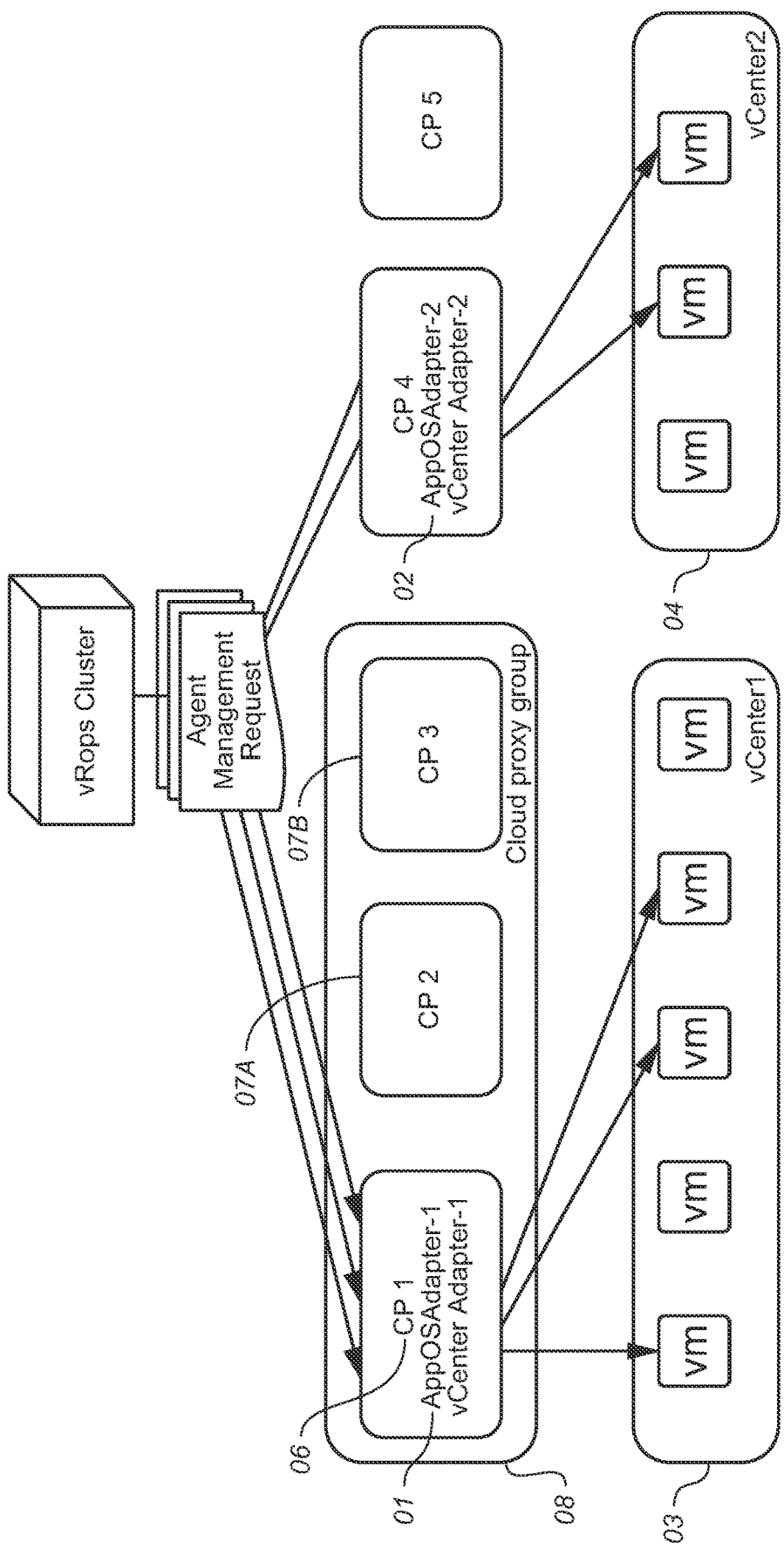
FIG. 1 shows a diagram of how the Cloud Proxy part of a Collector Group and as an Individual would be used to bootstrap a host.

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Metrics allow an end user to have insight on the state, behavior, value, or changes of a particular system or subsystem that is recognized by the metric name. There are many components that generate metrics, and there are different systems and tools that may receive the metrics and visually display them in a graphical format for better understanding on the user's part. These metrics typically are gathered from a host and forwarded to the appropriate systems. In the case of the present invention, these systems reside at least on cloud proxies (which may also forward the information to further points).

vROps based Application Monitoring solution enables infrastructure administrators and Application Administrators to discover applications running at a scale and to collect run-time metrics of the Operating System and the Application for monitoring and troubleshooting the respective entities. The monitoring and troubleshooting workflows are enabled from vROps which includes the configuration of a vROps Manager account as well as life cycle management of the agents on the Virtual Machines In pre-existing vROps based Application Monitoring a single instance of Adapter (AppOSAdapter) is created per vCenter configuration. All Agent management requests like bootstrap, un-bootstrap, content-upgrade, etc for managed endpoints is handled by the AppOSAdapter instance running on one of the Cloud Proxies. With this setup the Customer cannot scale the system beyond the limited number of Host supported by a single AppOSAdapter instance, even if they deploy multiple Cloud Proxies. This limitation is at least in part due to a one to one mapping between the AppOSAdapter and vCenter.

Fixing this issue would give the end user an option to Horizontally scale the system according to the workload of their environment in both the Collector Group and the individual Cloud Proxy. This is achieved by distributing the bootstrap request among the Cloud Proxy instances.

vROps based monitoring solution provides two main options for users to choose from when they deploy the monitoring solution. The first option being a Collector Group (Highly Available Cloud Proxies), and the second option being an individual Cloud Proxy.

The Collector Group option in vROps is designed to provide Highly Available Cloud Proxies. A Collector Group would contain at least two Cloud Proxies in order to enable High Availability. In this context, load based distribution of the bootstrap requests would make the Collector Group not only Highly Available but also Highly Scalable.

Unlike the Collector group, the Individual Cloud Proxy option does not provide High Availability. With need based distribution of bootstrap requests the user has an option to Horizontally scale based on their environment needs.

FIG. 1 shows a diagram of how the Cloud Proxy part of a Collector Group and as an Individual would be used to bootstrap a host. In the preexisting design of Application Monitoring, only one instance of AppOSAdapter 01, 02 can be created per configured vCenter 03, 04 be the Cloud Proxy 06 is deployed individually of part of Collector Group 08 In this setup, CP-2 07A and CP-3 07B are unable to take part in bootstrapping operations. This design limits the scalability of Application Monitoring.

Figure 2:
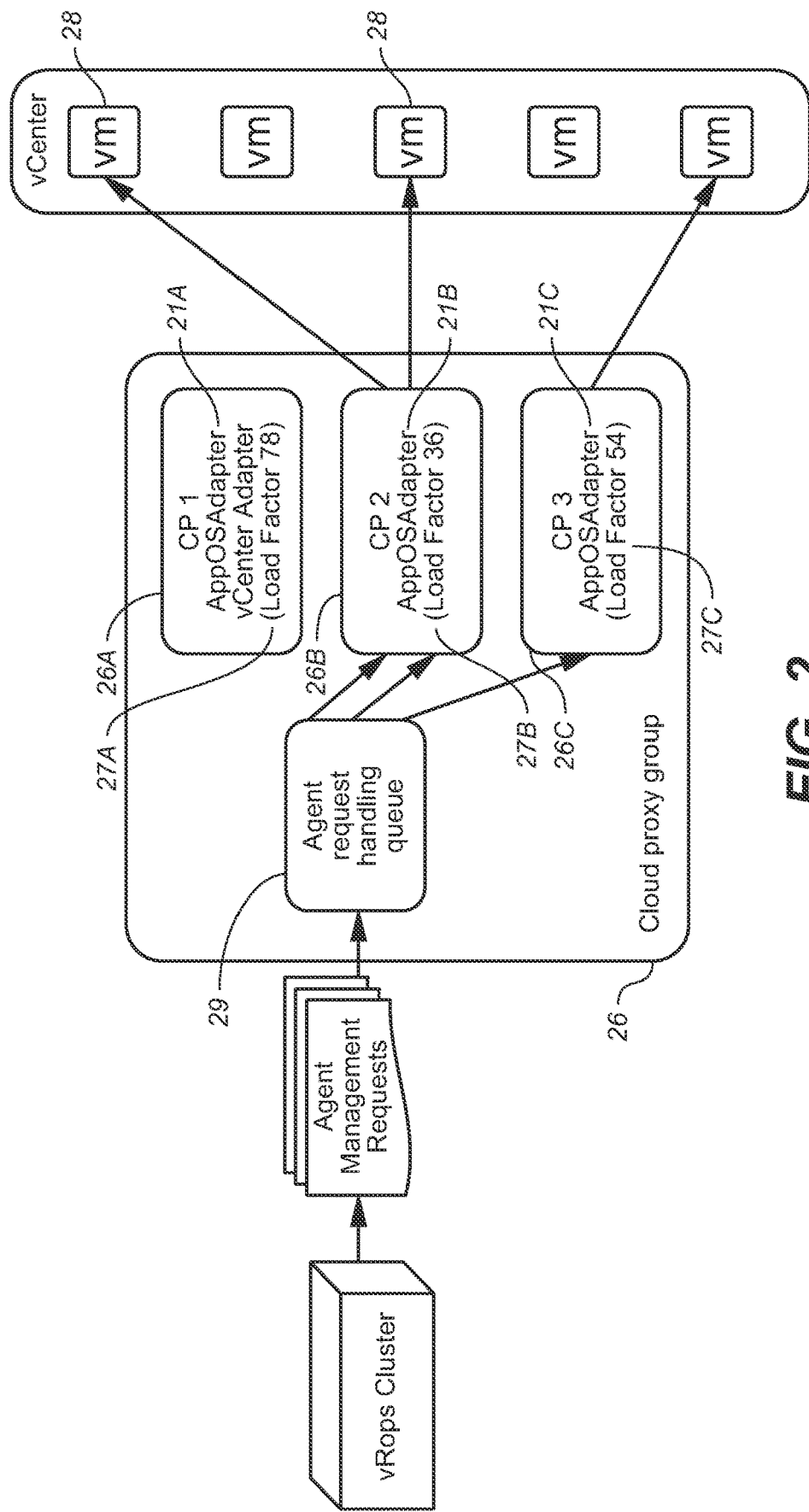
FIG. 2 shows a diagram of the distribution of bootstrap requests if the user chooses to utilize a Collector group.

FIG. 2 shows a diagram of the distribution of bootstrap requests if the user chooses to utilize a Collector group. In the present invention, the AppOSAdapters 21 A, B, C are created on all Cloud Proxies of the collector group per vCenter. In this embodiment, one instance of AppOSAdapter is created per Cloud Proxy.

During the Bootstrap process, if the user selects to use a Collector Group, the bootstrap request/requests are distributed based on load factor 27 A, B, C among the Cloud Proxies 26 A, B, C that are part of the selected Collector group 26. The load factor 27 A, B, C of a Cloud Proxy is determined by the number of Hosts already bootstrapped using it. For example, in FIG. 2 Cloud Proxy 26 B is shown to be receiving requests from Hosts 28, and has a resulting load factor 27 B of 36. During every bootstrap request, the Cloud Proxy which has the least load factor is given precedence and will accept the new request. This method ensures equal participation of all the Cloud Proxies that are part of a Collector Group.

One of the ways the Load factor for the AppOSAdapter 21 A, B, C running on Cloud Proxy 26 A, B, C can be computed is based on the "ARC FQDN" property of the Host. This property is added to the Host during every bootstrap request. In one embodiment, this property consists of at least the IP address of the Cloud proxy that the Host is connected to. A cumulative sum of the unique "ARC FQDN" would determine the load factor of that ARC machine, AppOSAdapter, or Cloud Proxy. The AppOSAdapter 21 A, B, C instances are added to the request handling queue 29 based on the Load factor during bootstrap request. Highest priority is given to the AppOSAdapter 21 A, B, C with the smallest load factor.

Once the Load factor is computed, the adapter instances 21 A, B, C are sorted according to their respective load factors 27 A, B, C and maintained in the request handling queue 29. Whenever a new request arrives from vROps, the AppOSAdapter instance with the smaller load factor will then be selected to handle the request, and the process repeats with each new request. In this way all the adapter instances 21 A, B, C will have the bootstrap requests load-balanced across the Cloud Proxies 26 A, B, C of Collector Group 26. In this embodiment, the Cloud proxies are able to handle the requests in parallel which assists in reducing bootstrap and user management request time.

In one embodiment, the load factor calculating process is instead computed periodically, or upon a system or user command. In another embodiment the "ARC FDQN" factor resides in AppOSAdapter 21 A, B, C instead of the host.

If a user wants to scale a Collector Group 26 then the user will be able to add a new Cloud Proxy (not shown) to the Collector Group. In this phase the load factor of that Cloud Proxy would be 0, and all the future bootstrap requests would be routed to that Cloud Proxy until it reaches at least the same load factor of that of the other Cloud Proxies that are part of the same Collector Group.

Practically, the process of working with load factors in a case with CP-1 26 A, CP-2 26 B, and CP-3 26 C being the Cloud Proxies that are part of a Collector Group 26 might progress as the following.

For example, if the bootstrap action is performed on one of the Hosts, a list of the Cloud Proxies in the Collector Group will be shown to the user. Then the system will check that there is an AppOSAdapter instance running on each Cloud Proxy. If an adapter instance doesn't exist then one will be created and assigned a load factor of 0. The Load factor will then be computed for each AppOSAdapter instance based on the FQDN property of Host and priority determined. Next, a first server request will be sent to the adapter instance with the least load factor value. With each new request, the load factor will be re-computed and the request will continue to be sent to the adapter instance with the least load factor value.

Finally, once the bootstrap operation is finished then the salt-master to salt minion communication is established and the agent operations such as start, stop, plugin activation, content upgrade, un-bootstrap will be handled by the same AppOSAdapter instance with which the endpoint is bootstrapped.

Figure 3:
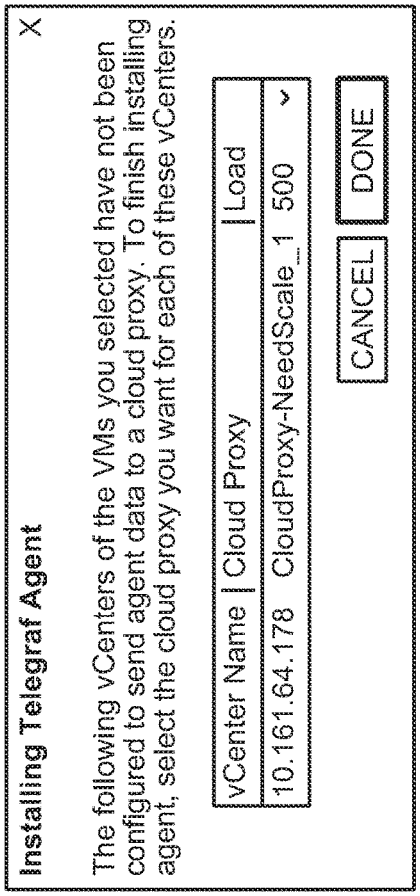
FIG. 3 shows an example UI to choose either a Collector Group or Individual Cloud Proxy for bootstrap request.

FIG. 3 shows an example UI for system setup. A UI prompt such as the one in FIG. 3 might be shown to the user during bootstrapping processes. In this example UI, the user will be shown a drop down menu to select either the Collector Group or an Individual Cloud Proxy option. In one embodiment, by default, the Collector Group or Cloud Proxy where the vCenter Adapter is configured will be shown. The load factors of the Collector Group and Cloud proxy would also be shown. In the case of the Collector group, the load factor would be the cumulative sum of all the Cloud Proxies within in. With this, the user is given an option to manually choose the most appropriate setup after inspecting the load factor. It should be understood that this UI is provided as an example.

In one embodiment, there is a maximum number of hosts that may be assigned to a single Individual Cloud Proxy or Collector group. In one embodiment, the UI shown to the user may be expanded to show the available options all at once in a table. In one embodiment, as described previously, the UI shows a drop down menu from which the user may view all the available Individual Cloud Proxies and Collector Groups. In one embodiment, the Individual Cloud Proxy or Collector Group with the smallest load factor may automatically be placed at the top of the list. In one embodiment, should all of the existing Individual Cloud Proxies and Collector Groups be at their maximum allowed load factor, a new Cloud Proxy will automatically be created either as an Individual Cloud Proxy or as a new Collector Group. In a similar embodiment, the user is instead prompted on if they would like to create a new Cloud Proxy.

Figure 4:
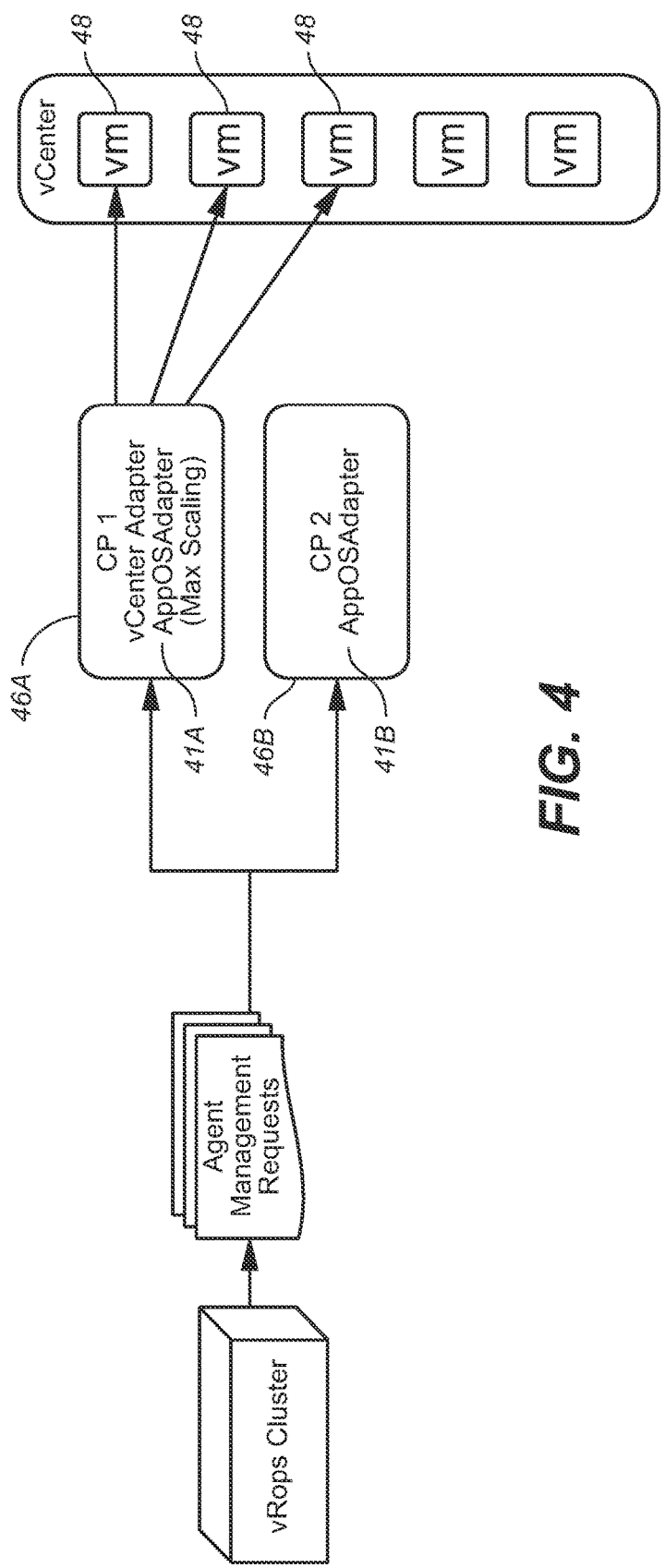
FIG. 4 shows a diagram of the present invention's setup if the user chooses to utilize individual Cloud proxies.

FIG. 4 shows a diagram of the present invention's setup if the user chooses to utilize for example individual Cloud proxy 46 A. Alternatively during the Bootstrap process, if the user selects an Individual Cloud Proxy, the bootstrap request/requests are routed through the selected Cloud Proxy. The "ARC FQDN" property is added to the Host during every bootstrap request and would determine which Cloud Proxy was used to bootstrap a particular Host. For example, FIG. 4 shows Cloud proxy 46 A as being used to bootstrap Host/s 48. Any subsequent activity like agent start/stop, plugin installation, content upgrade would happen through the AppOSAdapter 41 A running on the Cloud Proxy 46 A respectively with the "ARC FQDN" property.

In this setup, a user would have to manually take care of distributing the bootstrap requests. In one embodiment, the number of Hosts bootstrapped with a Cloud Proxy instance would be displayed as part of the Bootstrap flow. This display would assist the user in choosing the most appropriate Cloud Proxy based on scaling guidelines. Once scaling numbers or an individual Cloud Proxy has reached its maximum, the user can deploy an new Cloud Proxy instance and from there can choose the new instance for any subsequent bootstrap action. This system provides Need based distribution of bootstrap requests and assists in Horizontal scaling.

Practically, the process of working with load factors in a case with CP-1 46 A, and CP-2 46 B as the Individual Cloud Proxies might progress as the following.

During bootstrap actions, user is given an option to choose the Cloud Proxy with which they intend to perform the bootstrap request on the Host. The user is also shown how many Hosts have already been bootstrapped using a particular Cloud Proxy instance. Once configured, a server request may be sent to the adapter instance chosen by the user. With this scenario, tracking bootstrap load and choosing which Cloud Proxy will be used is done by the user for each new request. In one embodiment, the load balancing process may be done automatically.

Once the bootstrap operation is complete, the salt-master to salt-minion communication is established and the agent operations like start, stop, plugin activation, content upgrade, un-bootstrap will be handled by the same AppOS-Adapter instance with which the endpoint is bootstrapped.

With this solution, better utilization of Cloud Proxy resources can be achieved and assistance in scaling out the number of endpoints that are currently supported. There is no change in the number of agents supported per node, but with the current solution a vCenter beyond sizing guidelines can still be supported by adding more Cloud Proxies to the Collector Group or through Individual Cloud Proxy. This will also help in reducing the request handling and processing time for agent management action. The present invention would also provide better utilization of the available resources, and it would also increase the scaling number of the Application Monitoring solution. Request handling is very much optimized.

In one embodiment, the system will automatically view how many hosts need to be configured and calculate the minimum number of Cloud Proxies required to bootstrap every endpoint such that the Cloud Proxies are fully utilized. In another embodiment, the system will automatically view how many hosts need to be configured and will setup an appropriate number of Cloud Proxies such that each Cloud Proxy has an initially load factor a set amount below the recommended maximum.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A request distribution system comprising:
    a system configured to send a plurality of bootstrap requests;
    a plurality of cloud proxies configured to receive said plurality of bootstrap requests and coupled with adapters, the adapters being configured to manage agent requests for managed endpoints;
    a processor configured to provide load factors to the plurality of cloud proxies based on a number of hosts being bootstrapped by each cloud proxy, the processor further being configured to determine a distribution of bootstrap requests among the cloud proxies based on the load factors to achieve horizontal scalability of the system; and
    at least one host configured to communicate with one of the plurality of cloud proxies.

2. The request distribution system of claim 1 wherein, said request distribution system further comprises:
    a request handler fit to automatically determine which of at least one cloud proxy receives said plurality of bootstrap requests; and
    a collector group to bundle said at least one cloud proxy.

3. The request distribution system of claim 2 wherein, said collector group is assigned a load factor based on the number of said at least one host coupled to said each of at least one cloud proxy, said load factor to assist in evenly distributing said plurality of bootstrap requests.

4. The request distribution system of claim 1 wherein, a user manually distributes said plurality of bootstrap requests between said at least one cloud proxy.

5. The request distribution system of claim 4 wherein, each of said at least one cloud proxy is assigned a load factor based on the number of said at least one host coupled to said each of at least one cloud proxy, said load factor to assist in evenly distributing said plurality of bootstrap requests.

6. The request distribution system of claim 1 wherein, there is a limited number of said at least one host that can be coupled to a single instance of said at least one cloud proxy.

7. The request distribution system of claim 6 wherein, said highly available system automatically calculates how many instances of said cloud proxy are required such that the coupling of said at least one host is evenly distributed at a value below said maximum.

8. The request distribution system of claim 1 wherein, new instances of said adapter are automatically created.

9. A highly available system comprising:
    a system to send a plurality of bootstrap requests;
    a plurality of cloud proxies coupled with adapters;
    at least one cloud proxy fit to receive said plurality of bootstrap requests, wherein each instance of said at least one cloud proxy is coupled with an adapter;
    a request handler fit to determine which of at least one cloud proxy receives said plurality of bootstrap requests based on load factors among the plurality of cloud proxies;
    a collector group to bundle said at least one cloud proxy; and
    at least one host fit to communicate with one of said at least one cloud proxy;
    wherein each of said at least one cloud proxy is assigned a load factor based on the number of said at least one host coupled to said each of at least one cloud proxy, said load factor to assist in evenly distributing said plurality of bootstrap requests.

10. The highly available system of claim 9 wherein, there is a limited number of said at least one host that can be coupled to a single instance of said at least one cloud proxy.

11. The highly available system of claim 10 wherein, said highly available system automatically calculates how many instances of said cloud proxy are required such that the coupling of said at least one host is evenly distributed at a value below said maximum.

12. The highly available system of claim 9 wherein, new instances of said at least one cloud proxy are automatically created.

13. The highly available system of claim 9 wherein, new instances of said at least one cloud proxy are manually created.

14. A load distribution system comprising:
    a system to send a plurality of bootstrap requests, wherein a user manually distributes said plurality of bootstrap requests between at least one cloud proxy;
    a plurality of cloud proxies coupled with adapters, the adapters being configured to manage agent requests for managed endpoints;
    said at least one cloud proxy fit to receive said plurality of bootstrap requests, wherein each instance of said at least one cloud proxy is coupled with an adapter; and
    at least one host fit to communicate with one of said at least one cloud proxy;
    wherein each of said at least one cloud proxy is assigned a load factor based on the number of said at least one host coupled to said each of at least one cloud proxy, said load factor to assist in evenly distributing said plurality of bootstrap requests.

15. The load distribution system of claim 14 wherein, there is a limited number of said at least one host that can be coupled to a single instance of said at least one cloud proxy.

16. The load distribution system of claim 15 wherein, said highly available system automatically calculates how many instances of said cloud proxy are required such that the coupling of said at least one host is evenly distributed at a value below said maximum.

17. The load distribution system of claim 14 wherein, new instances of said adapter are automatically created.

18. The load distribution system of claim 14 wherein, new instances of said adapter are manually created.

* * * * *